United States Patent [19]

Shibuya

[11] Patent Number: 5,371,353

[45] Date of Patent: Dec. 6, 1994

[54] OBJECT DETECTING DEVICE HAVING MULTIPLE OPTICAL SENSORS WITH A COMMON OUTPUT LINE AND A COMMON SELECTION SIGNAL LINE

[75] Inventor: Yoshiki Shibuya, Tokyo, Japan

[73] Assignee: Oki Electric Industry Co., Ltd., Tokyo, Japan

[21] Appl. No.: 95,766

[22] Filed: Jul. 23, 1993

[30] Foreign Application Priority Data

Jul. 31, 1992 [JP] Japan .................................. 4-205527

[51] Int. Cl.$^5$ .............................................. H01J 40/14
[52] U.S. Cl. .................................. 250/208.3; 250/561; 358/498
[58] Field of Search ...................... 250/208.3, 556, 559, 250/562, 572, 563, 222.1, 221, 208.1, 223 R, 561; 340/555, 556, 557; 358/498

[56] References Cited

U.S. PATENT DOCUMENTS

| | | | |
|---|---|---|---|
| 4,864,651 | 9/1989 | Ogiwara et al. | 250/208.3 |
| 4,985,636 | 1/1991 | Fukui et al. | 250/559 |
| 5,053,616 | 10/1991 | Trett | 250/222.1 |

Primary Examiner—David C. Nelms
Assistant Examiner—Que T. Le
Attorney, Agent, or Firm—Steven M. Rabin

[57] ABSTRACT

In an image forming apparatus, the passage of paper is detected by light and compact optical sensor apparatus including a plurality of light emitting devices, a plurality of optical sensor units, each of which includes an optical sensor disposed so as to receive the light from the light emitting device and an output circuit for selectively outputting a signal from the optical sensor, and a control unit connected to the optical sensor units through common cables. The output circuit of each optical sensor unit passes the sensor signal from the optical sensor of the unit to an output terminal or outputs the signal to one of the terminals of the unit, according to a selection signal generated at the control unit for exclusively designating the optical sensor units. Since each optical sensor unit outputs the sensor signal only when selected, all optical sensor units can use a common output cables, thereby reducing the weight and the size of the apparatus.

18 Claims, 6 Drawing Sheets

OBJECT DETECTING DEVICE HAVING MULTIPLE OPTICAL SENSORS WITH A COMMON OUTPUT LINE AND A COMMON SELECTION SIGNAL LINE

CROSS-REFERENCE TO RELATED APPLICATIONS

This application claims priority benefits under 35 U.S.C §119 of Japanese application Serial No. 04-205,527, filed Jul. 31, 1992, the entire disclosure of which is incorporated herein by reference.

BACKGROUND OF THE INVENTION

1. Field of the Invention

This invention relates to an optical sensor apparatus for detecting the passage of paper, provided in an image forming apparatus, such as a facsimile machine, a copy machine or the like.

2. Description of Related Art

In an image forming apparatus, such as a facsimile machine, a copy machine, or the like, plural sheets of plain paper are loaded in a cartridge or a tray for storing paper. When printed, each sheet of paper is fed sheet by sheet front the cartridge or the tray to a photosensitive drum, at which toner image is applied to the paper. Since respective processes and timings of image formation have to correspond to the position of the paper, such an image forming apparatus generally uses an optical sensor apparatus constituted of a plurality of optical sensors disposed at positions at which existence or passage of the paper is detected. In order to simplify control of the optical sensor device, those optical sensors are controlled by a control unit including a central processing unit. Output terminals of each optical sensor are connected to cables, respectively, which are connected to the control circuit. While light is being emitted from the light emitting device, if a sheet of paper passes between the light emitting device and the corresponding optical sensor, the control unit receives an output signal of a low voltage from the optical sensor, thereby detecting that the paper is passing by the optical sensor. If the output voltage remains in a high voltage, the control circuit detects that no paper passes by the optical sensor.

In an image forming apparatus having such an optical sensor apparatus constituted of a plurality of optical sensors, however, the number of cables increases as the number of the optical sensors increases. For example, in an image forming apparatus, such as a facsimile machine, using the optical sensor device of twenty sensors or above, a bundle of the cables becomes 5 to 10 mm in diameter, so that the cables are prone to prevent the image forming apparatus from being compact in size and light in weight.

SUMMARY OF THE INVENTION

It is an object of the invention to provide an optical sensor apparatus with fewer cables connecting between a plurality of optical sensors and a control unit, thereby allowing an image forming apparatus to be compact and less in weight.

The foregoing object is accomplished with an optical sensor apparatus includes a plurality of light emitting devices disposed at predetermined positions of the image forming apparatus, a plurality of optical sensor units disposed so as to correspond to the locations of the light emitting devices, a common output cable connected commonly to all output terminals of the optical sensor unit, and a control unit for outputting a selection signal to activate only one of the optical sensor units and for detecting the passage of paper according to a signal in the common output cable. Each optical sensor unit includes an optical sensor for receiving light from the light emitting device and an output circuit for outputting a sensor signal from the optical sensor to an output terminal of the optical sensor unit when activated. Since the optical sensor unit exclusively selected by the control unit outputs a sensor signal to the common output cable, the optical sensor apparatus can detect the passage of paper without any individual cable for each optical sensor.

According to a preferred embodiment, the output circuit includes a predetermined number of inverters for distinguishing the selection signal for this optical sensor unit from the selection signal for the other optical sensor unit, where the selection signal is plural bit parallel signal. In another embodiment, the selection signal contains information of the optical sensor unit to be selected, and the output circuit is activated in accordance with the information. The information may be composed of N bit data signal for simplifying the cables therefor. The number of the output terminal can be plural so that each of the output terminals corresponds to each bit pattern of the information. The output circuit may include a comparator operated with a selection signal, a level of which is sequentially changeable. The comparator passes the sensor signal to the output terminal when the voltage of the selection signal is in a predetermined comparison range thereof.

In another aspect of the invention, an optical sensor apparatus for an image forming apparatus includes a plurality of light emitting devices for emitting light, a plurality of optical sensors disposed so as to correspond to the light emitting devices, respectively, a control unit for outputting a selection signal to select one of the optical sensors and for detecting the passage of paper, a plurality of selectors, each of which is connected to a group of the optical sensors and selects one optical sensor in the group in accordance with a selection signal from the control unit, and a common output cable connected to the output terminals of all of the selectors. Since the selector uses the common output cable for the groups of the optical sensors, an individual cable for each optical sensor is unnecessary.

BRIEF DESCRIPTION OF THE DRAWINGS

The above and other objects and features of the invention are apparent to those skilled in the art from the following preferred embodiments thereof when considered in conjunction with the accompanied drawings, in which.

DETAILED DESCRIPTION OF THE PREFERRED EMBODIMENTS

Figure 1:
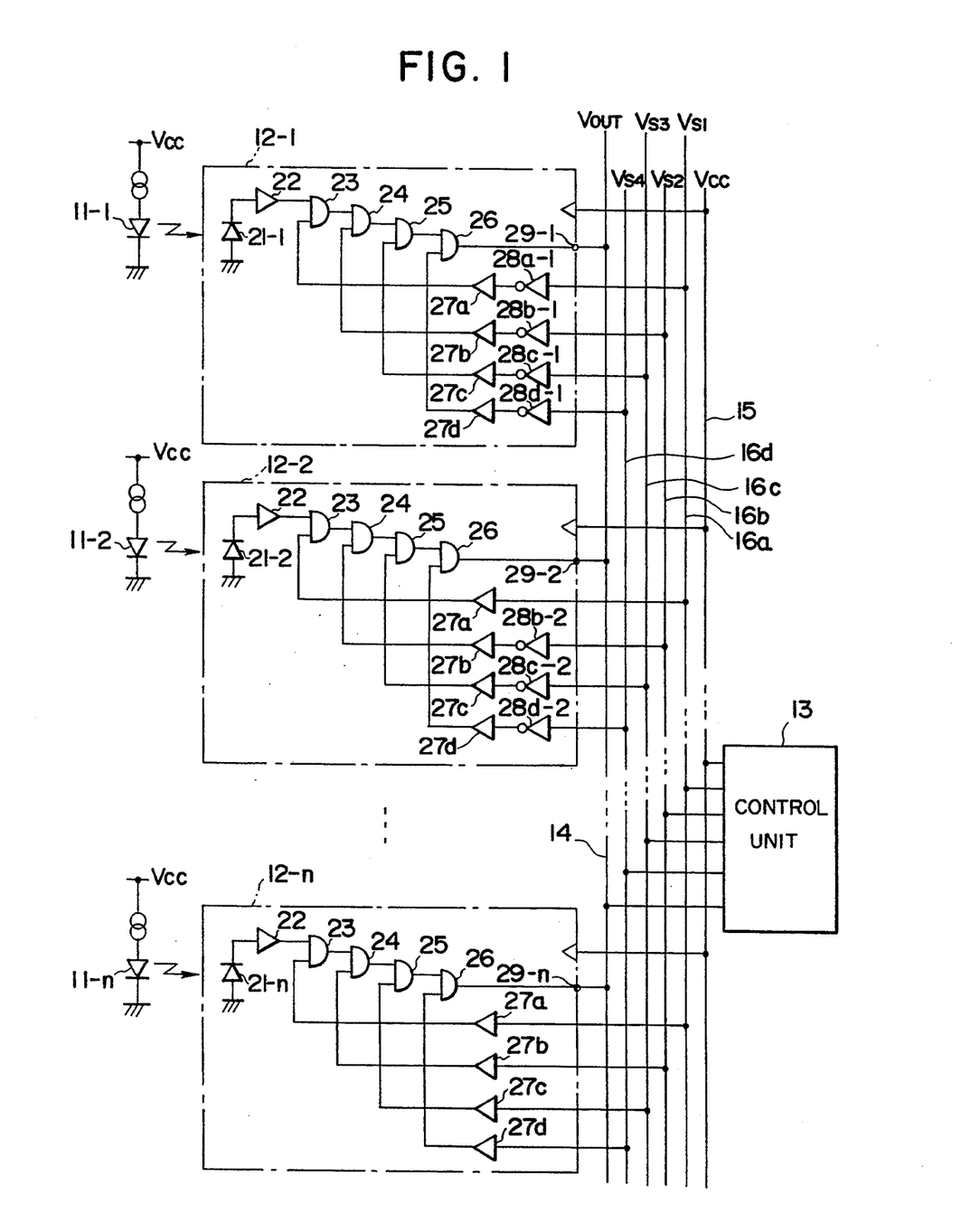
FIG. 1 is a block diagram illustrating an optical sensor apparatus according to a preferred embodiment of the invention.

Referring to the drawings in detail, in particular, to FIG. 1, an optical sensor apparatus according to a preferred embodiment of the invention is shown.

This optical sensor apparatus, formed at an image forming apparatus, mainly includes a plurality of light emitting devices 11-1 to 11-n, a plurality of optical sensor units 12-1 to 12-n, a control unit 13 generating binary selection signals, a common selection line, consisting of a common output cable 14, and four selection cables 16a to 16d, for transmitting the selection signals.

The optical sensor apparatus includes n light emitting devices 11-1 to 11-n disposed at predetermined positions, at which the passage of paper is detected, on the image forming apparatus. The number n is a power of Z, the power being equal to the number of the selection cables'. In this embodiment, the number n is sixteen, since the number of selection cables is four. One end of each light emitting device is connected to a power supply line of potential Vcc through a constant current source for a constant current. The other end of each light emitting device is connected to the ground.

Each of the optical sensor units 12-1 to 12-n is disposed so as to correspond to each light emitting device and is constituted of integrated circuits and the like. Each of optical sensor units 12-1 to 12-n has one of optical sensor 21-1 to 21-n for receiving light from corresponding light emitting devices 11-1 to 11-n and converting the light into electric current. Those optical sensors 21-1 to 21-n are composed of photodiodes or the like. The optical sensor units 12-1 to 12-n also include output circuits, respectively, each of which is composed of an amplifier 22 for converting current into voltage, a series of two-input AND gates 23 to 26, four input buffers 27a to 27d for a driving selection signal, and a number of inverters. In each unit, the input end of the amplifier 22 is connected to the output end of the optical sensor 21, and the output end of the amplifier 22 is connected to one input of the AND gate 23. The other input of the AND gate 23 is connected to the output end of the buffer 27a. The output of the AND gate 23 is connected to one input of the AND gate 24. The other input of the AND gate 24 is connected to the output end of the buffer 27b. The output of the AND gate 24 is connected to one input of the AND gate 25. The other input of the AND gate 25 is connected to the output end of the buffer 27c. The output of the AND gate 25 is connected to one input of the AND gate 26. The other input of the AND gate 26 is connected to the output end of the buffer 27d. The output of the AND gate 26 is connected to an output terminal 29. All the output terminals 29-1 to 29-n of all units are connected to a single common output cable 14. Each unit 12-1 to 12-n inputs selection signals front four parallel selection cables 16a to 16d through the input buffers 27a to 27d. Inverters 28 are provided between the selection cables 16a to 16d and the input buffers 27a to 27d, respectively. The number of and the position of inverters 28 vary depending on the optical sensor units. For example, the second unit 2-2 has the inverters 28b-2, 28c-2, and 28d-2 between the selection cables 16b to 16d and the input buffers 27b to 27d, respectively, but does not have any inverter between the selection cable 16a and the input buffer 27a. Moreover, in another unit, the inverters 28 are provided differently between the selection cables 16a to 16d and the input buffers 27a to 27d. Since the positions and the numbers of the inverters 28 are different from one another among the units, only one unit is selected by the selection signal given from the control unit 13 through the selection cable 16a to 16d. In this embodiment, one optical sensor unit 12-n has no inverter; four optical sensor units 12 have a single inverter; six optical sensor units 12 have two inverters; four optical sensor units 12 have three inverters; one optical sensor unit 12-1 has four inverters. Accordingly, the total number of ways of arranging up to four inverters is sixteen. In one of the optical sensor units, when the selection signals of the high level input directly to the input buffers and the selection signals of the low level input only to the inverters, respectively, all outputs of the input buffers 27a to 27d in the optical sensor unit become the high level. In the other optical sensor unit at that time, at least one output of the input buffers 27a to 27d is the low level. The series of AND gates 23 to 26 passes the output of the amplifier 22 to the output terminal 29 only when all outputs of the input buffers 27a to 27d are at the high level. Therefore, only one optical sensor unit is exclusively selected by the control unit 13 through the selection signals. The control unit 13 also provides power supply voltage Vcc to the optical sensor units 12-1 to 12-n through the power supply line 15.

Figure 2:
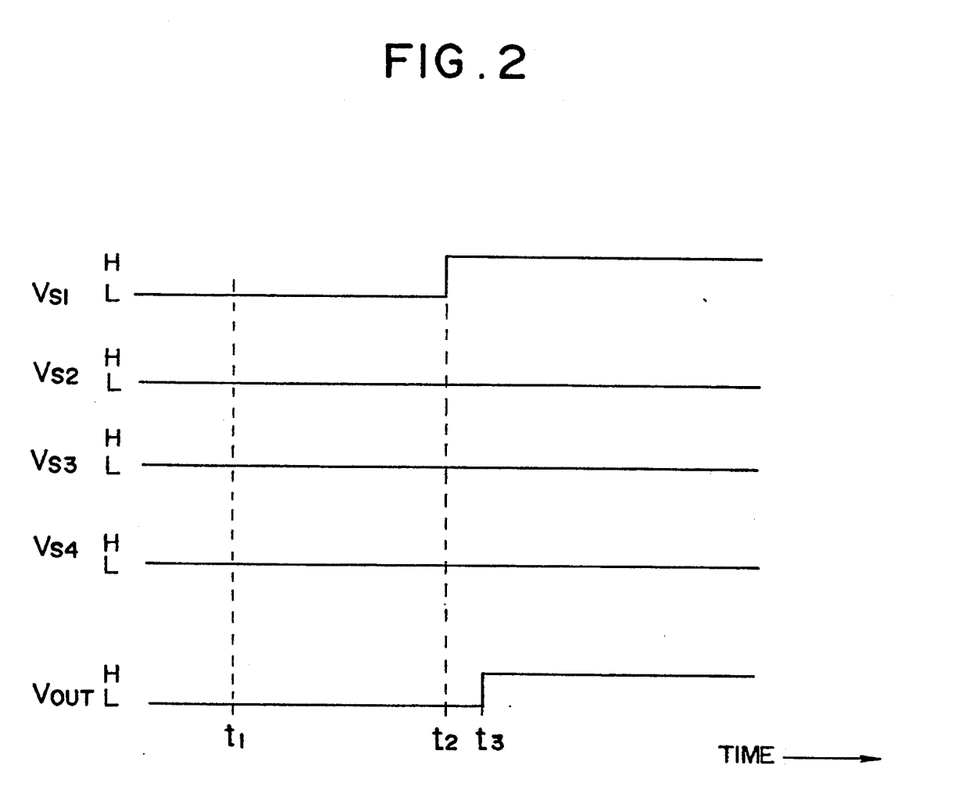
FIG. 2 is a time chart for operation of the optical sensor apparatus of FIG. 1.

In operation, when the control unit 13 outputs selection signals $V_{S1}$ to $V_{S4}$, only one of tile optical sensor units is activated. For example, if the control unit 13 outputs selection signals $V_{S1}$ to $V_{S4}$ of the low level at time $t_1$, as shown in FIG. 2, all outputs of the inverters 28a-1 to 28d-1 in the optical sensor unit 12-1 are the high level, so all outputs of the input buffers 27a to 27d become the high level, and therefore, the series of AND gates 23 to 26 passes the sensor signal of the optical sensor 21-1 to the output terminal 29-1. In the other optical sensor units, at least one of the AND gates 23 to 26 receives the low level signal, so that the sensor signal never reaches the output terminal 29 except in the unit 12-1. The sensor signal at the output terminal 29-1 is then transmitted through the common output cable 14 to the control unit 13 at which the passage of the paper is detected according to the level of the sensor signal. If the paper is passing through the position between the light emitting device 11-1 and the optical sensor 21-1, the control unit 13 detects that the sensor signal from the unit 12-1 is the low level as the paper is now passing. On the other hand, if the paper is not passing through the position, the sensor signal is at the high level since the optical sensor 21-1 receives light from the light emitting device 11-1 and converts it to an electric signal, which is amplified to the high level signal at the amplifier 22.

In order to select one of the other optical sensor units, the control unit 13 changes the selection signals $V_{S1}$ to $V_{S4}$. In FIG. 2, the selection signal $V_{S1}$ is shifted from the low level to the high level at time $t_2$. According to this level shift at time $t_2$, the output of the inverter 28a-1 turns to the low level, thereby cutting off the signal at the AND gate 26 in the unit 12-1. At the same time, the output of the input buffer 27a in the unit 12-2 turns to the high level since the input buffer 27a in the unit 12-2 directly receives the selection signal $V_{S1}$. Then, all outputs of the input buffers 27a to 27d in the unit 12-2 become the high level, so that the series of the AND gates 23 to 26 in the unit 12-2 passes the sensor signal from the optical sensor 21-2 to the common output cable 14.

In this optical sensor apparatus, the control unit 13 controls sixteen optical sensor units by only six common cables. Therefore, the optical sensor apparatus can make the image forming apparatus compact in size and light in weight.

Figure 3:
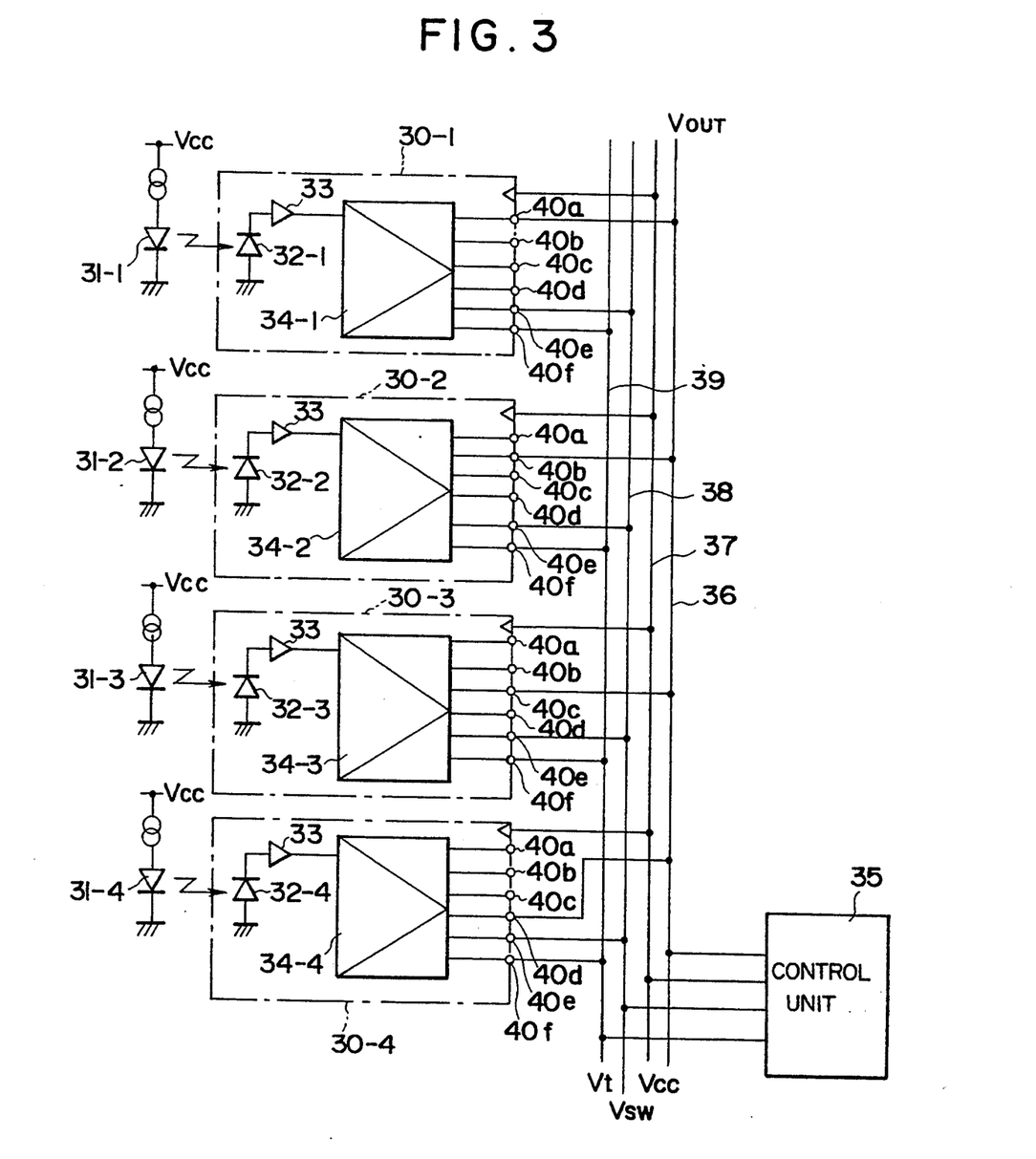
FIG. 3 is a block diagram illustrating an optical sensor apparatus according to another preferred embodiment of the invention.

Referring to FIG. 3, an optical sensor apparatus according to another embodiment is shown.

This optical sensor apparatus includes four light emitting devices 31-1 to 31-4, four optical sensor units 30-1 to 30-4, four cables 36 to 39 including a common output cable 36, and a control unit 35.

The light emitting devices 31-1 to 31-4 are disposed at the predetermined positions of the image forming apparatus, respectively. The optical sensor units 30-1 to 30-4 are disposed so as to correspond to the light emitting devices 31-1 to 31-4, respectively. Each unit has the same circuitry. That is, in each unit, one of optical sensors 32-1 to 32-4 is disposed so as to receive light from one of the light emitting devices 31-1 to 31-4. The outputs of the optical sensor 32-1 to 32-4 are connected to the input ends of amplifiers 33, respectively. The outputs of the amplifier 33 are fed to demultiplexers 34-1 to 34-4, respectively, as output circuits. Each of the demultiplexers 34-1 to 34-4 has four output terminals 40a to 40d and two input terminals 40e, 40f. The demultiplexer 34-1 to 34-4 inputs the sensor signal from the corresponding amplifier 33 and outputs the sensor signal to one of four output terminals 40a to 40d according to the signals from input terminals 40e, 40f.

The control unit 35 outputs a timing signal Vt to a cable 39, a selection signal Vsw to a cable 38, and a power supply voltage Vcc to a cable 37 and inputs (receives) sensor signal Vout from a common output cable 36. The common output cable 36 is commonly connected to all of four units 30-1 to 30-4 through only one of four output terminals 40a to 40d. The cables 39, 38 for signals Vt, Vsw are connected commonly to the input terminals 40e, 40f, respectively, of all units 30-1 to 30-4. The cable 37 is also connected to all units 30-1 to 30-4 to feed the power supply voltage Vcc.

Figure 4:
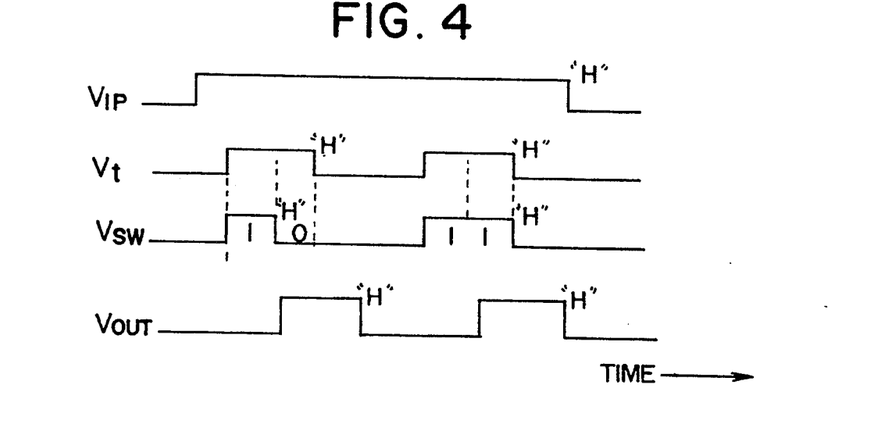
FIG. 4 is a time chart for operation of the optical sensor apparatus of FIG. 3.

In operation, the control unit 35 outputs selection signals Vsw to the cable 38 and timing signals Vt to the cable 39. As shown in FIG. 4, while the sensor signal $V_{IP}$ is at the high level, the timing signal Vt is shifted to the high level to enable demultiplexers 34-1 to 34-4 to receive the selection signal Vsw. The selection signal Vsw is composed of 2 bit information data signals for designating one of output terminals 40a to 40d of each of the demultiplexers 34-1 to 34-4. In FIG. 4, a first selection signal Vsw corresponding to the high level of the timing signal Vt is "10" for designating the output terminal 40c of each demultiplexer. Since the output terminal 40c of the demultiplexer 34-3 is only connected to the common output cable 36, tile control unit 35 can detect the passage of the paper about the unit 30-3. The sensor signals at other output terminal 40c of the demultiplexers 34-1, 34-2, 34-4 are never detected because these terminals are not connected to the common output terminal 36. After detecting the first selection signal Vsw, the control unit 35 then outputs another timing signal Vt of the high level and a second selection signal Vs of 2 bit information, "11," for designating the output terminal 40d of the demultiplexers 34-1 to 34-4. Since the output terminal 40d of the demultiplexer 34-4 is only connected to the common output cable 36, the control unit 35 can detect the passage of the paper about the unit 30-4. In FIG. 4, the sensor signal Vout shows the conditions of no passage of paper.

In this optical sensor apparatus, the optical sensor units 30-1 to 30-4 have the same constitution, so that the cost of the optical sensor units can be reduced. The number of cables for signal inputting to and outputting from the control circuit 35 is only three. Therefore, the optical sensor apparatus can make the image forming apparatus compact in size and light in weight. Although in this embodiment the number of the optical sensor units is four, this optical sensor apparatus can connect five optical sensor units or above by increasing the number of output terminals.

Figure 5:
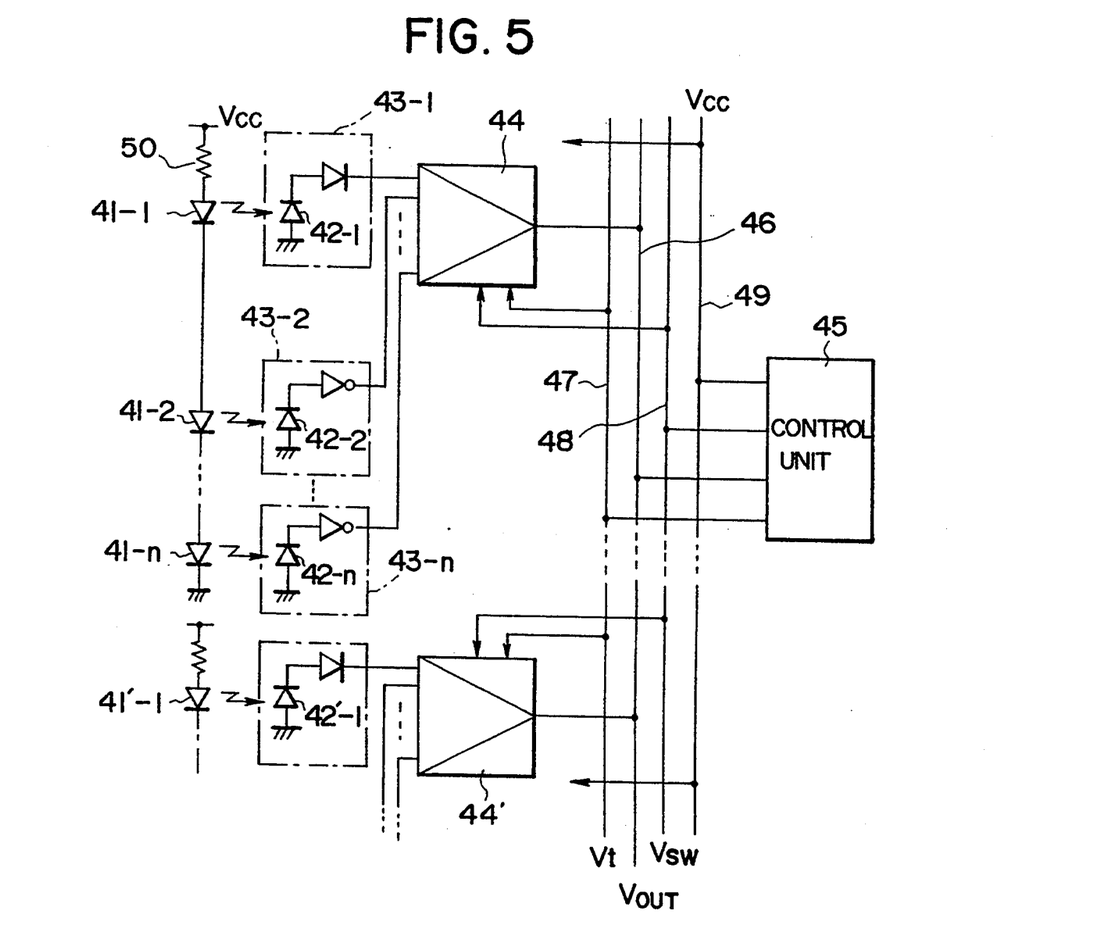
FIG. 5 is a block diagram illustrating an optical sensor apparatus according to a further preferred embodiment of the invention.

Referring to FIG. 5, another embodiment of the optical sensor apparatus is shown. The optical sensor apparatus includes a number of groups of optical sensors and light emitting devices.

In a group of this apparatus, for example, in a first group, a plurality of light entitling devices 41-1 to 41-n are connected in series. One end of the series is connected to a line for power supply potential Vcc through a resistor 50, and the other end of the series is connected to the ground.

A plurality of optical sensor units 43-1 to 43-n, composed, for example, of an integrated circuit, are disposed so as to correspond to the light emitting devices 41-1 to 41-n, respectively. Each optical sensor unit includes respective optical sensor units 42-1 to 42-n for receiving light from the light emitting device anti outputting a sensor signal according to the received light, and an amplifier for converting the output current of the optical sensor to a certain voltage. The outputs of the optical sensor units 43-1 to 43-n are fed to a multiplexer 44, serving as a selector, which selects one of the optical sensor units 43-1 to 43-n according to a selection signal Vsw outputted from a control unit 45 through a cable 48 and outputs the sensor signal Vout to the control unit 45 through a cable 46.

The control unit 45 outputs a timing signal Vt to a cable 47, a selection signal Vsw to a cable 48 and a power supply voltage Vcc to a cable 49. The timing signal Vt is for enabling multiplexers 44, 44', . . . to receive the selection signal Vsw. The selection signal Vsw is a 6-bit digital information signal for selecting one of multiplexers 44, 44', . . . and one of optical sensors 42 to be connected to the selected multiplexer. The control unit 45 inputs the sensor signal Vout from designated optical sensor through the cable 46 and detects the passage of the paper at the designated optical sensor 42. The cables 47 to 49 are commonly connected to the multiplexers.

Figure 6:
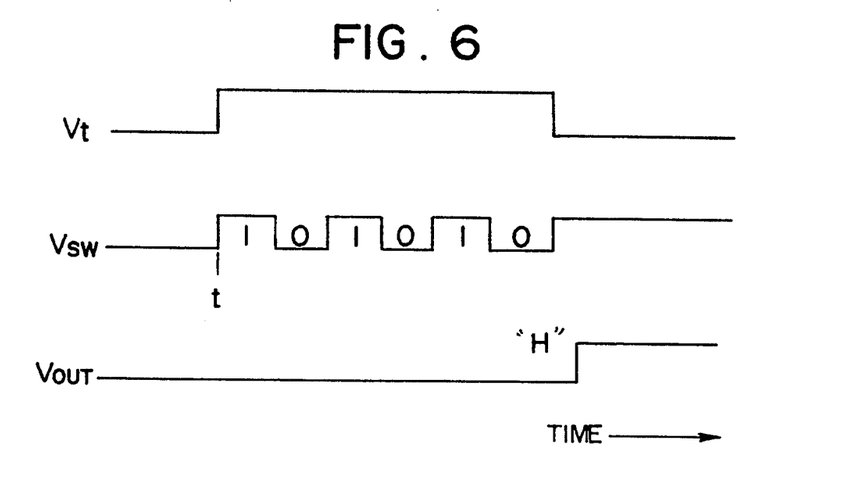
FIG. 6 is a time chart for operation of the optical sensor apparatus of FIG. 5.

In operation, as shown in FIG. 6, the timing signal Vsw is shifted to the high level, and then all the multiplexers 44, 44', . . . receive the selection signal Vsw. According to the 6-bit selection information in the selection signal Vsw, for example "101010" as shown in FIG. 6, only one of the optimal sensors connected to one of the multiplexer outputs sensor signal Vout to the cable 46, and the control unit 45 detects the passage of the paper according to the sensor signal Vout. In FIG. 6, the sensor signal Vout shows the high level, which means that the paper is not passing by the position at the designated optical sensor.

The number of cables for signal inputting to and outputting from the control circuit 45 is only three. Therefore, the optical sensor apparatus according to the embodiment cam make the image forming apparatus compact in size and light in weight. Moreover, the multiplexers are disposed so as to concentrate the lines of optical sensor units in one group, so that fewer cables are enough to communicate between the sensor units and the control units 45.

Figure 7:
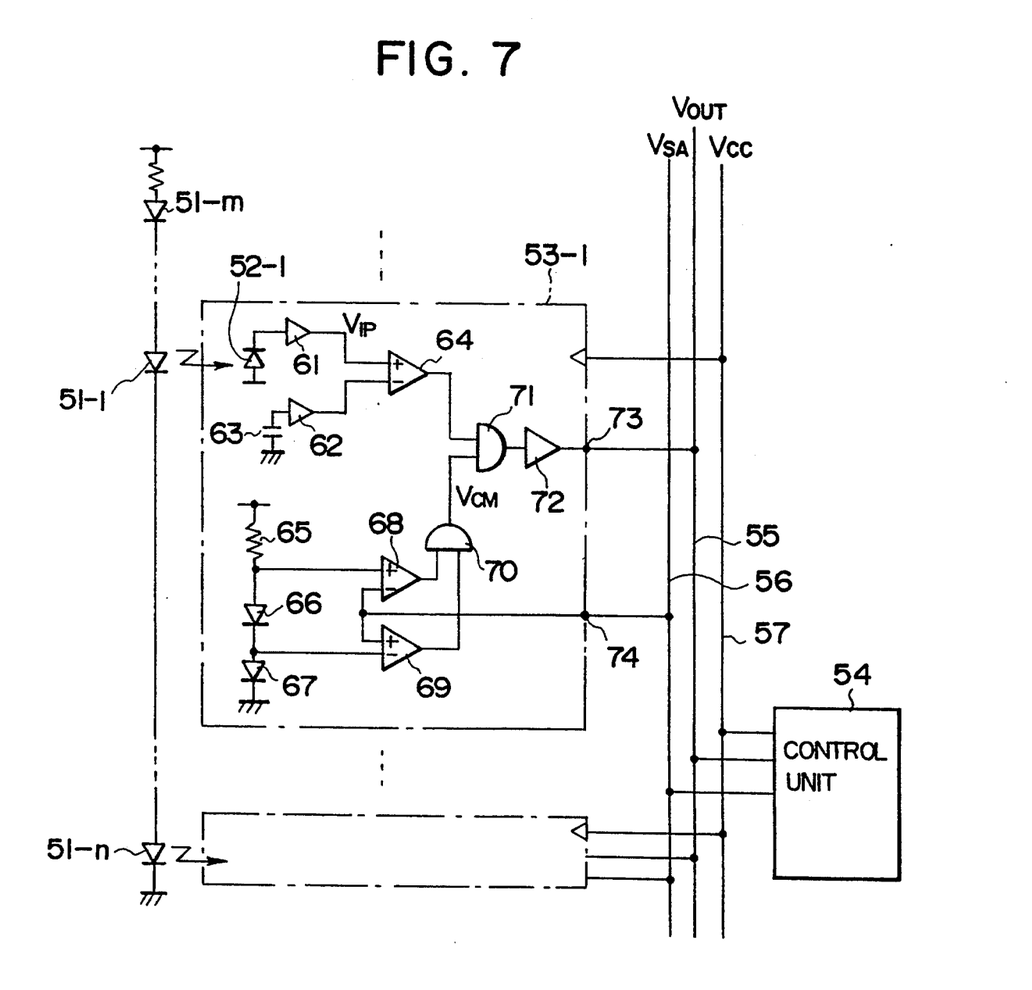
FIG. 7 is a block diagram illustrating an optical sensor apparatus according to an even further preferred embodiment of the invention.

Referring to FIG. 7, another optical sensor apparatus, in which the selection signal is an analog voltage signal, is shown.

In this apparatus, a plurality of light emitting devices 51-m, ..., 51-1, ..., 51-n are disposed at the predetermined position of the image forming apparatus, and a plurality of optical sensor units are disposed so as to correspond to the light emitting devices. Among optical sensor units, for example, the optical sensor unit 53-1 includes an optical sensor 52-1 and an output circuit as well as other unit. The output of the optical sensor 52-1 is connected to the positive input of a comparator 64 through an amplifier 61. A reference capacitor 63, having the same capacitance as the optical sensor 52-1, is connected between ground and the input of an amplifier 62 having the same gain to the amplifier 61. The output of the amplifier 62 is connected to the negative input of the comparator 64. The output of the comparator 64 is connected to one input of the AND gate 71, whose the other input is connected to the output of an AND gate 70. The output of the AND gate 71 is connected to an output terminal 73 of the optical sensor unit 53-1 through an amplifier 72. In each unit, an analog voltage comparating circuit is provided for receiving an analog voltage as a selection signal. In this unit, the analog voltage comparating circuit includes a resistor 65 for restricting current therethrough, a pair of diodes 66, 67 for determining levels of comparison, a pair of comparators 68, 69, and the AND gate 70. The resistor 65 and the diodes 66, 67 are connected in series between the power supply voltage Vcc and ground. A junction between the resistor 65 and the diode 66 is connected to a positive input of the comparator 68 to give the comparator 69 an upper reference voltage. A junction between diodes 66, 67 is connected to a negative input of the comparator 69, to give the comparator 69 a lower reference voltage A negative input of the comparator 68 and a positive input of the comparator 69 are commonly connected to the input terminal 74 of the optical sensor unit 53-1. The input terminal 74 is connected to a control unit 54 through a cable 56 for analog voltage selection signal $V_{SA}$. The control unit 54 also outputs a power supply voltage to a cable 57 and inputs the sensor signal Vout through a common output cable 55 from the selected optical sensor unit. The cables 55 to 57 are connected to each optical sensor unit.

Figure 8:
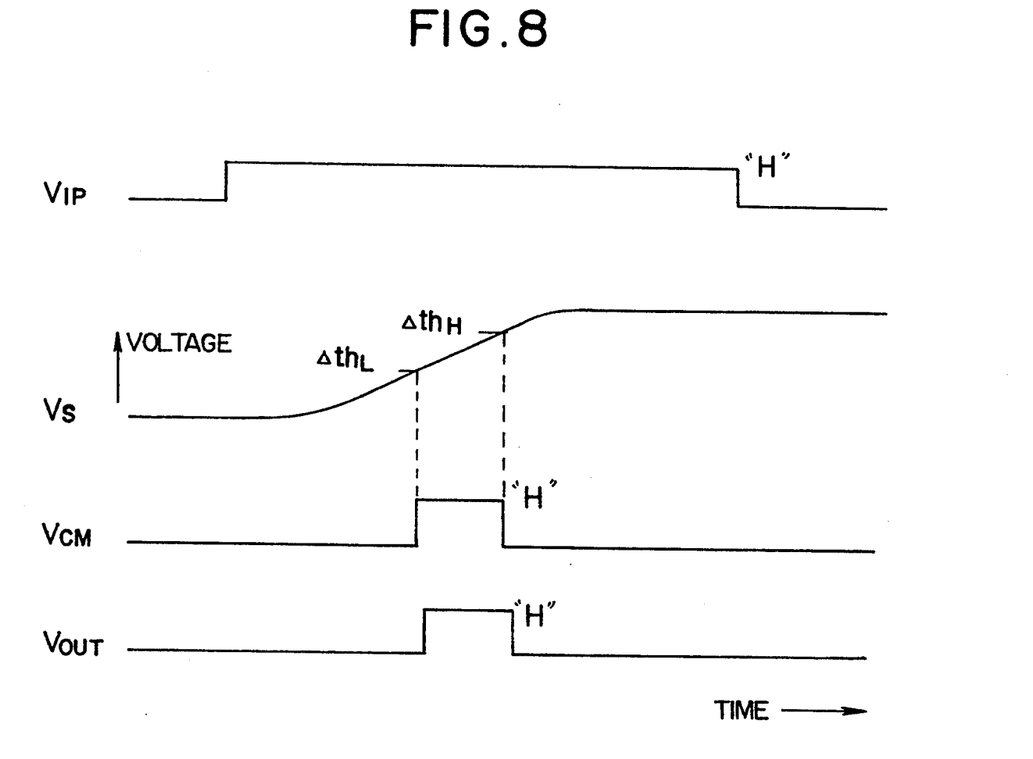
FIG. 8 is a time chart for operation of the optical sensor apparatus of FIG. 7.

In operation, the analog voltage comparing circuit outputs a high level signal to the AND gate 71 only when the analog voltage selection signal $V_{SA}$, produced at the control unit 54 to select only one of the optical sensor units, is in a voltage range determined by the diodes 66, 67. That is, each diode generally has a voltage drop effect of 0.6 Volt when a current of about 20 $\mu$A flows through the forward biased diode. In the unit 53-1, as a result of serial connection of the diodes 66, 67, the positive input of the comparator 68 receives 1.2 Volts as the upper reference voltage and the negative input of the comparator 69 receives 0.6 Volt as the lower reference voltage. The number of the diodes is varied according to the optical sensor units, and therefore, a unique voltage range is set to each optical sensor unit. If the analog voltage selection signal $V_{SA}$ is lower than 0.6 Volt, the output of the comparator 69 is at the low level, so that the output signal $V_{CM}$ of the AND gate 70 becomes the low level, thereby cutting off the flow of the sensor signal at the AND gale 71. Therefore, the sensor signal never comes out from the unit 53-1 when the analog voltage selection signal $V_{SA}$ is lower than 0.6 Volt. If the analog voltage selection signal $V_{SA}$ is higher than 1.2 Volts, the output of the comparator 68 is at the low level, so that the output signal $V_{CM}$ of the AND gate 70 becomes the low level, thereby cutting off the flow of the sensor signal at the AND gate 71. Similarly, the sensor signal never comes out from the unit 53-1 when the analog voltage selection signal $V_{SA}$ is higher than 1.2 Volts. If the analog voltage selection signal $V_{SA}$ is between 0.6 Volt and 1.2 Volts, the outputs of the comparators 68, 69, both, are at the high level, so that the output signal $V_{CM}$ of the AND gate 70 becomes the high level, thereby allowing the sensor signal to pass through the AND gate 71 and thereby outputting the sensor signal from the output terminal 73 to the control unit 54. In FIG. 8, the signal $V_{IP}$ of the high level means no passage of the paper at the position of the optical sensor 52-1. Only when the analog voltage selection signal $V_{SA}$ is in a range from $\Delta th_H$ to $\Delta th_L$, the output signal $V_{CM}$ of the AND gate 70 of the unit 53-1 becomes the high level, and then the sensor voltage Vout in the common output cable 55 becomes the high level. In other units, since the voltage range of selection of one optical sensor unit is different from that of the other optical sensor unit, the AND gate 71 of the other unit passes the sensor signal when the voltage of the analog voltage selection signal $V_{SA}$ is in other range. The power supply voltage for driving an ordinary integrated circuit is 5 Volts, or actually around 4.5 to 5.5 Volts. Where the voltage drop per diode is 0.6 Volt, seven diodes can be connected in series between the ground and the power supply voltage. Therefore, six optical sensor units can be selected by changing the analog voltage outputted from the control unit 54. If the analog voltage is shifted up to 12 Volts, ten optical sensor units or above can be connected to the cables.

In this embodiment, the number of cables for signal inputting to and outputting from the control circuit 54 is only two. Therefore, the optical sensor apparatus according to the embodiment can make the image forming apparatus compact in size and light in weight.

It is to be noted that although the light emitting device is provided separately with the optical sensor in the embodiments described above, a plurality of photo-interrupters in which a light emitting device is incorporated in an optical sensor unit may be used.

It is understood that although the present invention has been described in detail with respect to preferred embodiments thereof, various other embodiments and variations are possible to those skilled in the art which fall within the scope and spirit of the invention, and such other embodiments and variations are intended to be covered by the following claims.

What is claimed is:

1. An optical sensor apparatus comprising:
   a plurality of light emitting devices for emitting light, disposed at predetermined positions;
   a plurality of optical sensor units, each of which is disposed so as to correspond to a respective one of said light emitting devices and includes an optical sensor for receiving the light from said respective one of said light emitting devices and an output circuit for outputting a sensor signal from said optical sensor to an output terminal of the optical sensor unit;
a common output cable connected to the output terminals of said optical sensor units;
a control unit for outputting a selection signal to selectively activate the output circuit of any one of said optical sensor units and for receiving the sensor signal from said common output cable; and
a common selection signal line connecting said control unit to each of optical sensor units, for carrying the selection signal to each of the output circuits.

2. An optical sensor apparatus as set forth in claim 1, wherein the output circuit includes a detecting circuit for detecting a selection of one of said optical sensor units from the selection signal.

3. An optical sensor apparatus as set forth in claim 1, wherein the selection signal includes a plurality of digital signals.

4. An optical sensor apparatus as set forth in claim 1, wherein said selection signal contains information identifying the optical sensor unit to be selected, and the output circuit is selected in accordance with said information.

5. An optical sensor apparatus as set forth in claim 3, wherein the selection signal includes N bit digital signals, where N is a natural number, and wherein a number of said optical sensor units is $2^N$.

6. An optical sensor apparatus as set forth in claim 4, wherein the information is composed of N bit data, where N is a natural number, and wherein a number of said optical sensor units is $2^N$.

7. An optical sensor apparatus as set forth in claim 1, wherein said control unit outputs an enable signal to give timing to said optical sensor units.

8. An optical sensor apparatus as set forth in claim 2, wherein the selection signal is a digital signal said common selection signal line comprises a plurality of cables for carrying respective bits of the digital signal, the detecting circuits of the output circuits of the respective optical sensor units having structures uniquely corresponding to the respective optical sensor units and all receiving the digital signal, the detecting circuit of the output circuit of only the selected optical sensor unit activating the output circuit to transmit the sensor signal from the optical sensor of the selected sensor unit.

9. An optical sensor apparatus as set forth in claim 2, wherein the selection signal is an analog voltage signal having a voltage level corresponding uniquely to the selected optical sensor unit, said common selection signal line comprising a single selection signal cable for carrying the analog voltage signal to the detecting circuits of the output circuits of the respective optical sensor units, each detecting circuit being responsive to a different voltage level so that the detecting circuit of only the selected optical sensor unit responds to the analog voltage signal to activate the output circuit to transmit the sensor signal from the optical sensor of the selected sensor unit to the common output cable.

10. An optical sensor apparatus as set forth in claim 1, further comprising a common timing cable connecting said control unit to the output circuits of each of said optical sensor units, wherein the selection signal is a digital signal, said common selection signal line comprising a single selection cable for carrying the digital signal, the output circuits of the respective optical sensor units having identical structures and a plurality of output terminals equal in number to the number of said optical sensor units, each of said output circuits being responsive to the digital signal to supply the sensor signal of the corresponding optical sensor to a corresponding one of the output terminals of the output circuit, only one output terminal of each output circuit being connected to the common output cable, the connected output terminals uniquely corresponding to the respective optical sensor units, whereby the sensor signal from only the selected optical sensor unit is transmitted to the common output cable.

11. An optical sensor apparatus, comprising:
a plurality of light emitting devices for emitting light, disposed at predetermined positions;
a plurality of optical sensor units, each of which is disposed so as to correspond to a respective one of said light emitting devices and includes an optical sensor for receiving the light from said respective one of said light emitting devices and an output circuit for outputting a sensor signal from said optical sensor to an output terminal of the optical sensor unit;
a common output cable connected to the output terminals of said optical sensor units; and
a control unit for outputting a selection signal to activate the output circuit of one of said optical sensor units and for receiving the sensor signal from said common output cable, said output circuit including an analog voltage comparing circuit for passing said sensor to said output terminal when the voltage of the selection signal is in a predetermined comparison voltage range of the comparing circuit.

12. An optical sensor apparatus as set forth in claim 9, wherein said output circuit includes an analog voltage comparing circuit for passing said sensor to said output terminal when the voltage of the selection signal is in a predetermined comparison voltage range of the comparing circuit.

13. An optical sensor apparatus as set forth in claim 12, wherein the analog voltage comparing circuit includes a plurality of series connected diodes for determining the comparison voltage range.

14. An output sensor apparatus as set forth in claim 11, wherein the analog voltage comparing circuit includes a plurality of series connected diodes for determining said comparison voltage range.

15. An optical sensor apparatus comprising:
a plurality of light emitting devices for emitting light, disposed at predetermined positions;
a plurality of optical sensors, each of said optical sensors disposed so as to correspond to a respective one of the light emitting devices, for outputting sensor signals at a time that light from said respective one of light emitting devices is received;
a control unit for outputting a selection signal to select one of said optical sensors;
a common selection signal line connected to said control unit, for carrying the selection signal;
a plurality of selectors, each of which
is connected to said common selection signal line and to a corresponding one of said optical sensors, and
selectively allows the corresponding optical sensor to output the sensor signal thereof in accordance with the selection signal from said control unit; and a common output cable connected to said output terminals of all of said selectors;

wherein said control unit detects an object disposed between said light emitting device and said optical sensor according to the sensor signal received from said common output cable.

16. An optical sensor apparatus, comprising:

a plurality of light emitting devices for emitting light, disposed at predetermined positions;

a plurality of optical sensors, each of the optical sensors being disposed so as to receive light from a respective one of said light emitting devices and output a corresponding sensor signal;

a control unit for outputting a selection signal identifying one of said optical sensors;

a common selection signal line, connected to said control unit for carrying the selection signal;

a common output cable connected to said control unit; and a plurality of selectors, each having output terminals connected to said common output cable and each commonly connected to said common selection signal line to receive the selection signal therefrom, each of the optical sensors being connected to a respective one of the plurality of selectors for providing the optical signals thereto, said selectors having means, responsive to the selection signal, for outputting the sensor signal from the optical sensor identified by the selection signal, whereby said control unit detects an object disposed between said light emitting device and the optical sensor identified by the selection signal, according to the sensor signal received on the common output cable.

17. An optical sensor apparatus as set forth in claim 16, wherein said plurality of selectors includes a first selector and a second selector, said plurality of optical sensors includes a first group of said optical sensors connected to said first selector, and a second group of said optical sensors connected to said second selector, the first selector having means, responsive to the selection signal, for outputting to the sensor signal from the optical sensor identified by the selection signal, when the identified optical sensor is included in the first group, the second selector having means, responsive to the selection signal, for outputting to the sensor signal from the optical sensor identified by the selection signal, when the identified optical sensor is included in the second group.

18. An optical sensor apparatus as set forth in claim 17, wherein said first and second selectors comprise multiplexers, further comprising a timing signal line for carrying a timing signal from said control unit to said multiplexers.

* * * * *